Feb. 26, 1929.
H. J. MURPHY
1,703,281
LUBRICATING APPARATUS
Filed Nov. 18, 1924
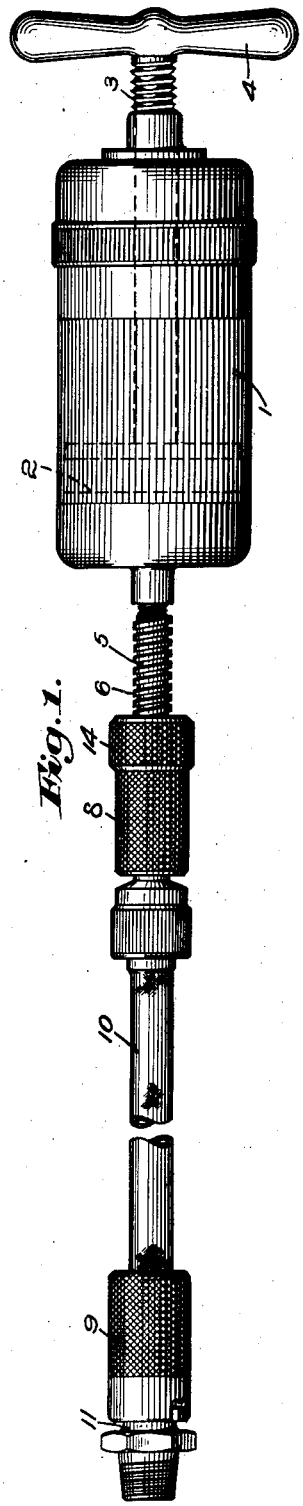
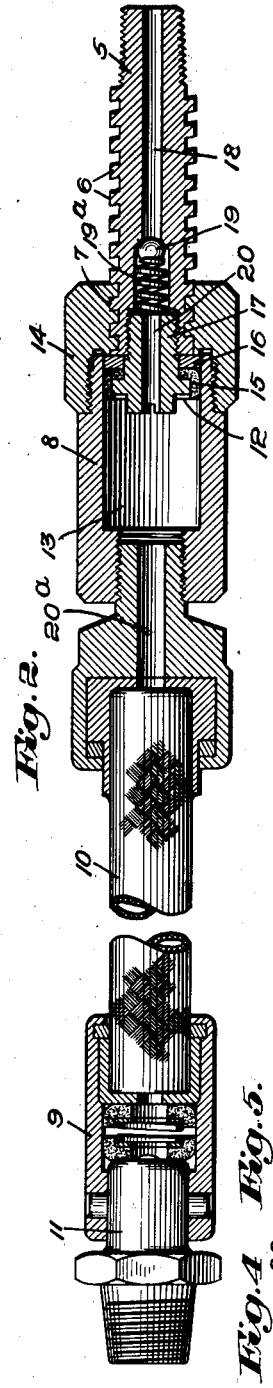
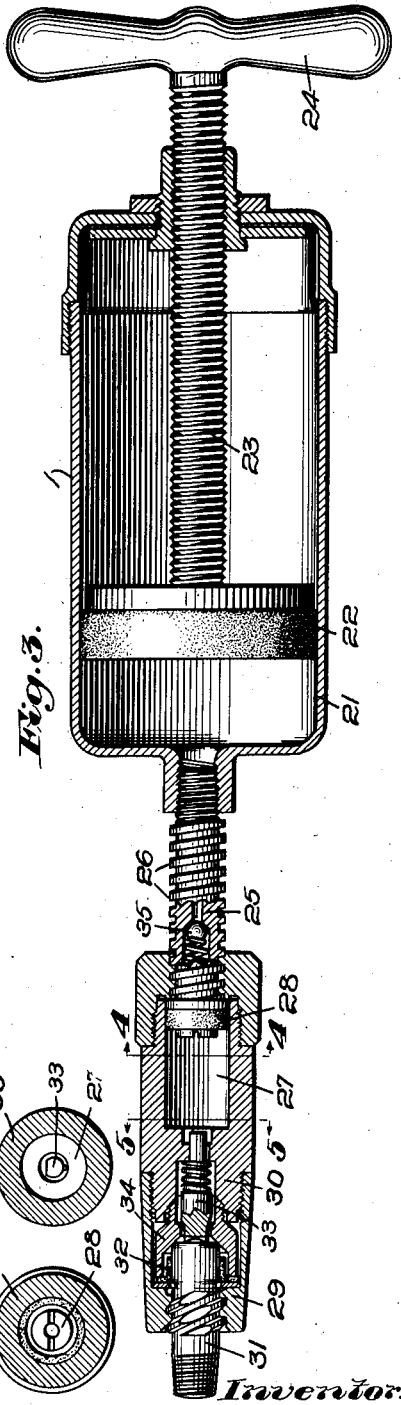
Inventor.
Howard J. Murphy.
by Emery, Booth, Janney & Varney
Attys Patented Feb. 26, 1929.

1,703,281

UNITED STATES PATENT OFFICE.

HOWARD J. MURPHY, OF READING, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed November 18, 1924. Serial No. 750,603.

This invention aims to provide improvements in lubricating apparatus.

In the drawings, which illustrate a preferred and a modified form of my invention:—

Figure 1 is a plan view of the apparatus as attached to a lubricant-receiving part;

Fig. 2 is a plan section, partly in elevation, of the high pressure part and the coupling part of my invention showing the coupling part attached to the lubricant-receiving part and the high pressure piston in a position to expel lubricant under relatively high potential pressure.

Fig. 3 is a longitudinal section, partly in elevation, of a modified form of my invention showing the coupling member attached directly to the high pressure cylinder.

Fig. 4 is a section on the line 4—4 of Fig. 3; and

Fig. 5 is a section on the line 5—5 of Fig. 3.

Referring to the drawings, I have shown a lubricant-expelling device that permits the expulsion of lubricant therefrom under low pressure as a normal operation and, when desirable, by a simple operation to expel lubricant therefrom under a relatively higher pressure and at the same time permitting the use of a device that holds a fair amount of lubricant and which is operative by turning a handle in the same direction to expel the lubricant either at high or low pressure, as desired.

Referring now to the preferred form of my invention as illustrated in Figs. 1 and 2, I have shown a combined low pressure and high pressure lubricant-expelling gun having a barrel 1, the usual piston 2, shown in dotted lines in Fig. 1, operated by a relatively low pressure screw 3 having attached thereto at its outer end a handle 4. At the discharge end of the barrel 1, I have provided a conduit 5 which permits passage of lubricant from the barrel 1 to the high pressure cylinder 8. Beyond the high pressure cylinder 8, I have provided a coupling 9 for engagement, as illustrated, with the lubricant-receiving part 11, and between the coupling 9 and the high pressure cylinder 8, I have provided a flexible conduit 10 through which the lubricant passes to the lubricant-receiving part 11 when the coupling is secured thereto.

While the coupling and lubricant-receiving part may be of any suitable construction, I have preferred to illustrate a coupling and lubricant-receiving part substantially as shown and described in Letters Patent No. 1,307,734, issued to Arthur V. Gullborg June 24, 1919.

The high pressure cylinder 8 presents a chamber 13 which is substantially smaller in cross-section than the cross-sectional area of the barrel 1. The chamber 13 is provided with a piston 12 which is operated in the chamber 13 to expel lubricant therefrom under relatively high potential pressure.

The piston 12 comprises a cup-shaped gasket 15, a steel washer 16 and a locking screw 17 which is threadedly secured to the outlet end of the conduit 5, thereby to hold the parts of the piston in assembled relation with the conduit, so that the piston and conduit move as a unit. Operation of the piston in the chamber 13 is effected by a relatively steep pitch male thread 6, cut on the conduit 5, which cooperates with a female thread 7 cut into the removable back head 14 of the cylinder 8. Thus rotation of the conduit in one direction moves the piston toward the front end of the chamber to expel lubricant therefrom under a relatively high potential pressure.

Lubricant may be supplied to a bearing, which is not clogged with dust, dirt or hardened grease, by holding the barrel 1 in one hand and turning the handle 4 with the other hand. Thus the lubricant is forced under low potential pressure from the barrel 1 through the passage 18 in the conduit 5, past the check valve 19, through the passage 20 in the locking screw 17, through the chamber 13, the passage 20ª at the outlet end of the chamber 13, through the flexible conduit 10 and through the coupling 9 to the lubricant-receiving part 11, as best illustrated in Fig. 2.

When lubricant under high pressure is needed to open a clogged bearing, the piston 12 is drawn back to the inlet end of the cylinder 8 by holding the cylinder in one hand and rotating the barrel in a counter-clockwise direction with the other hand, thus causing the threads on the conduit to unscrew relative to the threads in the back head 14. Lubricant is then forced from the barrel into the chamber 13 and is entrapped therein against returning to the barrel by the ball check 19 normally held against a seat in the conduit 5 by a spring 19ª, which is interposed between the ball check and the back end of the locking screw 17.

Lubricant may then be discharged from the cylinder 13 at a relatively high potential pressure because of the small cross-sectional area, by holding the cylinder 8 against turning and rotating with the barrel 1 or the handle 4, thereby turning the threads 6 of the conduit into the back head 14 and forcing the piston 12 forward to discharge the lubricant from the chamber 13 through the flexible conduit 10 into the lubricant-receiving part 11.

Referring now to the modified form of my invention illustrated in Figs. 3 to 5, I have shown a lubricant-expelling gun including a barrel 21, piston 22 operated by a low pressure screw thread stem 23 having a handle 24 and a conduit 25 having a high pressure thread 26. All the above-mentioned parts are substantially as shown and described in relation to the preferred embodiment of my invention. The high pressure chamber 27 and the piston 28 are also substantially as shown in the preferred form of my invention.

In this instance (Fig. 3), I have omitted the flexible conduit connection and connected the coupling 29 directly to the high pressure cylinder 30.

While the coupling 29 and lubricant-receiving part 31 may also be of any desired construction, I have shown a coupling which includes a hat washer or sealing washer 32, closure valve 33 and valve seat part 34 substantially similar to like parts shown and described in my co-pending application Serial No. 616,302, filed February 1st, 1923.

With this type of lubricant gun, the lubricant may be expelled under high or low pressure as desired by using one hand only. Two hands are necessary only when the piston 28 is withdrawn from the front end to the back end of the chamber 27 preparatory to expulsion of lubricant therefrom under a relatively high potential pressure.

To force lubricant into the lubricant-receiving part 31, the operator grasps the handle 24 and slips the coupling member 29 over the smooth end of the lubricant-receiving part 31, then by rotating the handle in a clockwise direction, the coupling is threadedly connected to the lubricant-receiving part.

When the coupling is secured to the lubricant-receiving part, as shown in Fig. 3, the valve 33 is opened and lubricant may be supplied to the lubricant-receiving part 31 under relatively low pressure or high pressure as desired.

Assuming the parts to be in the position shown in Fig. 3, the lubricant may be expelled from the barrel 21 by rotating the handle 24 in a clockwise direction. Thus the barrel 24 and conduit 25 are rotated relative to the rest of the device until the piston 28 seats against the outlet end of the chamber 27. Then, by further rotation of the handle 24, the low pressure screw 23 moves forward in relation to the barrel of the gun, thereby forcing the piston 22 against the lubricant to feed it into the lubricant-receiving part 31 under a relatively low potential pressure.

When it is desirable to force lubricant to the lubricant-receiving part under a relatively higher pressure than is obtainable from the barrel 21, the operator grasps the cylinder with one hand and with the other retracts the piston 29 by rotating the barrel in a contra-clockwise direction. During this operation, the lubricant in the barrel, which is under pressure, flows past the spring-pressed ball check 35 into the chamber 27 as fast as the piston 28 is retracted from the front of the chamber to the back thereof. The operator then turns the handle 24 again in a clockwise direction, the barrel 21, plunger 22 and the conduit 25 turning with it as a unit, to force the piston 28 forward in the chamber 27, thus discharging lubricant therefrom under a relatively high potential pressure to the lubricant-receiving part 31.

While I have shown and described preferred and modified forms of embodiments of my invention, it will be understood that changes involving omission, alteration, substitution and reversal of parts, and even changes in the mode of operation, may be made without departing from the scope of my invention, which is best defined in the following claims.

Claims:

1. Lubricant apparatus comprising, in combination, a barrel, expelling means for forcing lubricant therefrom, means providing a cylinder generally aligned with said barrel and presenting a substantially smaller cross-sectional area than said barrel, a conduit part directly and non-rotatably secured to said barrel and cooperating inclined means between the conduit and the means providing the cylinder to permit axial movement of one toward the other by relative rotation, a piston in said cylinder and valvular means located between said barrel and said cylinder for preventing return of lubricant from said chamber to said barrel when being expelled from said cylinder by said piston at a relatively high potential pressure.

2. Lubricating apparatus comprising, in combination, a barrel, expelling means for forcing lubricant therefrom, a cylinder generally aligned with said barrel and presenting substantially smaller cross sectional area than said barrel, a conduit part rigidly secured to said barrel, cooperating inclined means between said conduit and said cylinder to permit axial movement of one towards the other by relative rotation, a piston in said cylinder movable with said conduit, and valvular means in said conduit adjacent the outlet end thereof for preventing return of lubricant from said cylinder to said barrel when being expelled from said cylinder by said piston at a relatively high potential pressure.

In testimony whereof, I have signed my name to this specification.

HOWARD J. MURPHY.